United States Patent
Zhang et al.

(10) Patent No.: US 7,950,859 B2
(45) Date of Patent: May 31, 2011

(54) LENS COVER AND PORTABLE ELECTRONIC DEVICE USING THE SAME

(75) Inventors: Bo Zhang, Shenzhen (CN); Guan-Qun Zeng, Shenzhen (CN); Zhi-Zhong Xiao, ShenZhen (CN); Juan-Rong Wu, ShenZhen (CN); Po-Feng Ho, Taipei Hsien (TW)

(73) Assignees: Shenzhen Futaihong Precision Industry Co., Ltd., ShenZhen, Guangdong (CH); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/544,791

(22) Filed: Aug. 20, 2009

(65) Prior Publication Data
US 2010/0166414 A1   Jul. 1, 2010

(30) Foreign Application Priority Data
Dec. 31, 2008 (CN) .......................... 2008 1 0306751

(51) Int. Cl.
*G03B 17/00* (2006.01)

(52) U.S. Cl. ...................................................... 396/448
(58) Field of Classification Search ................... 396/448
See application file for complete search history.

(56) References Cited

U.S. PATENT DOCUMENTS

| | | | | |
|---|---|---|---|---|
| 6,305,852 | B1 * | 10/2001 | Suzuki et al. | 396/349 |
| 6,347,893 | B1 * | 2/2002 | Shiono et al. | 396/448 |
| 6,636,264 | B1 * | 10/2003 | Nakao et al. | 348/375 |
| 6,637,953 | B2 * | 10/2003 | Nakanishi et al. | 396/448 |
| 6,796,727 | B2 * | 9/2004 | Tanabe | 396/448 |
| 7,604,171 | B2 * | 10/2009 | Chang | 235/454 |
| 7,665,913 | B2 * | 2/2010 | Kim | 396/448 |
| 2006/0073858 | A1 * | 4/2006 | Nagashima | 455/575.4 |
| 2009/0086088 | A1 * | 4/2009 | Lee | 348/374 |

* cited by examiner

*Primary Examiner* — W. B. Perkey
*Assistant Examiner* — Linda B Smith
(74) *Attorney, Agent, or Firm* — Steven M. Reiss

(57) ABSTRACT

A lens cover slidably mounted to a lens comprises a main body and two guide plates protruding from opposite sides of the main body. Each guide plate has a plurality of contact portions. Each contact portion includes a plurality of projection strips protruding from a surface thereof and facing the lens.

20 Claims, 4 Drawing Sheets

LENS COVER AND PORTABLE ELECTRONIC DEVICE USING THE SAME

This application is related to co-pending U.S. patent application Ser. No. 12/544,799, entitled "LENS COVER AND PORTABLE ELECTRONIC DEVICE USING THE SAME", by Rong-Qiang Gao et al. Such applications have the same assignee as the present application and have been concurrently filed herewith. The above-identified applications are incorporated herein by reference.

BACKGROUND

1. Technical Field

The exemplary disclosure generally relates to lens covers, and particularly to lens covers used in portable electronic devices.

2. Description of Related Art

Digital camera assemblies are increasingly incorporated into many types of portable electronic devices of increasing quality and functionality as the market demands and increased technological capability allows, while still maintaining portability of the device.

With increased quality comes an increased need for protection of the imaging window of the digital camera assembly. Typically, as the quality of the camera assembly increases, the requirement for larger and higher quality lenses increases. Larger lenses allow more light into the camera assembly, and thereby improve the image quality. To maintain the quality of the images, a lens cover is often slidably mounted on the lens to prevent scratches and other marks endemic to portable device use. However, friction between the lens and the lens can impede the lens cover from smoothly sliding relative to the lens.

Therefore, there is room for improvement within the art.

BRIEF DESCRIPTION OF THE DRAWINGS

Many aspects of the exemplary embodiments can be better understood with references to the following drawings. The components in the drawings are not necessarily drawn to scale, the emphasis instead being placed upon clearly illustrating the principles of the exemplary lens cover and portable electronic device using lens cover. Moreover, in the drawings like reference numerals designate corresponding parts throughout the several views. Wherever possible, the same reference numbers are used throughout the drawings to refer to the same or like elements of an exemplary embodiment.

DETAILED DESCRIPTION

Figure 1:
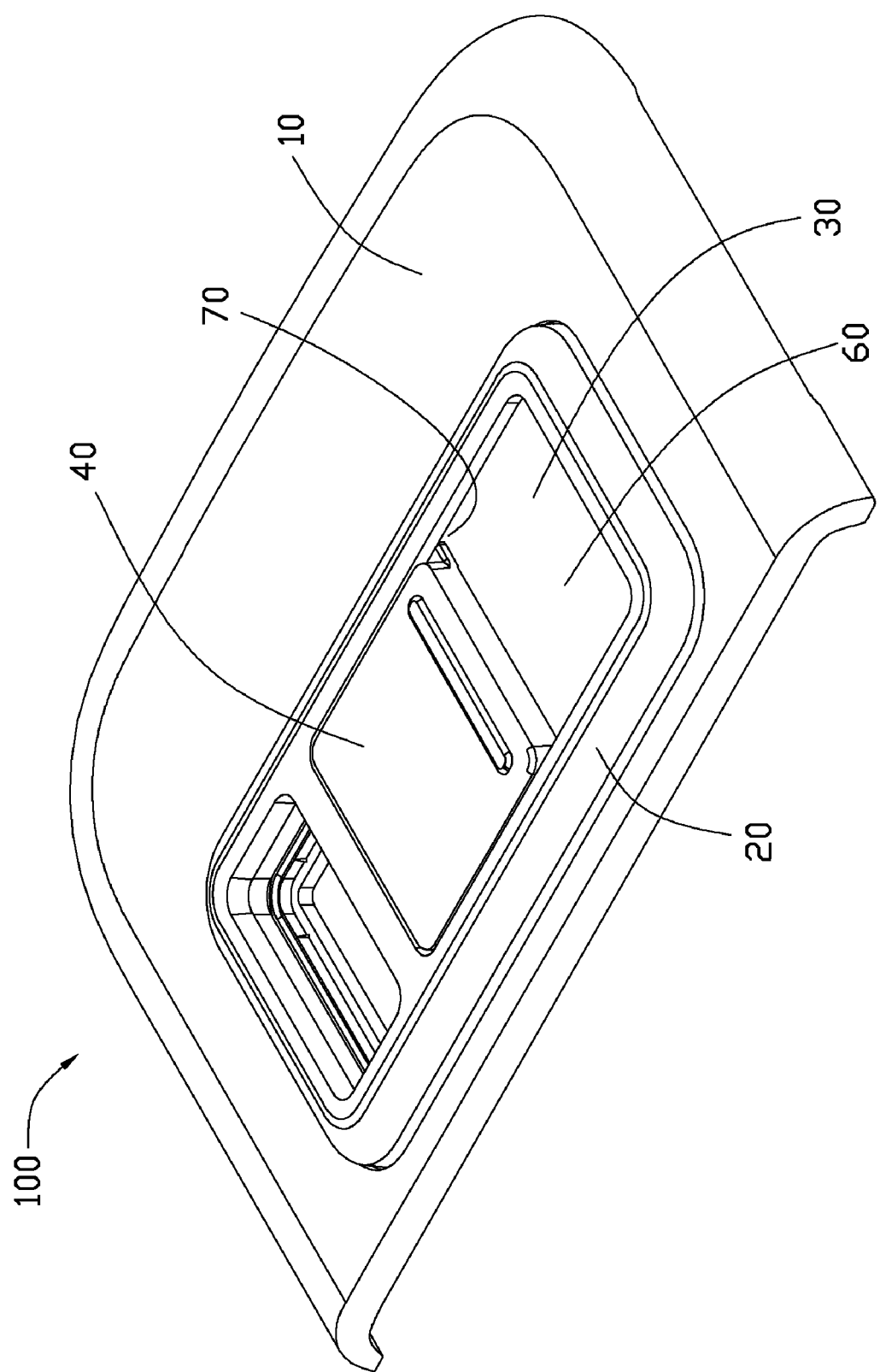
FIG. 1 is an exploded view of a lens cover for a portable electronic device as disclosed, applied in a portable electronic device, also as disclosed, including a housing, a rear cover, and a lens.
Figure 2:
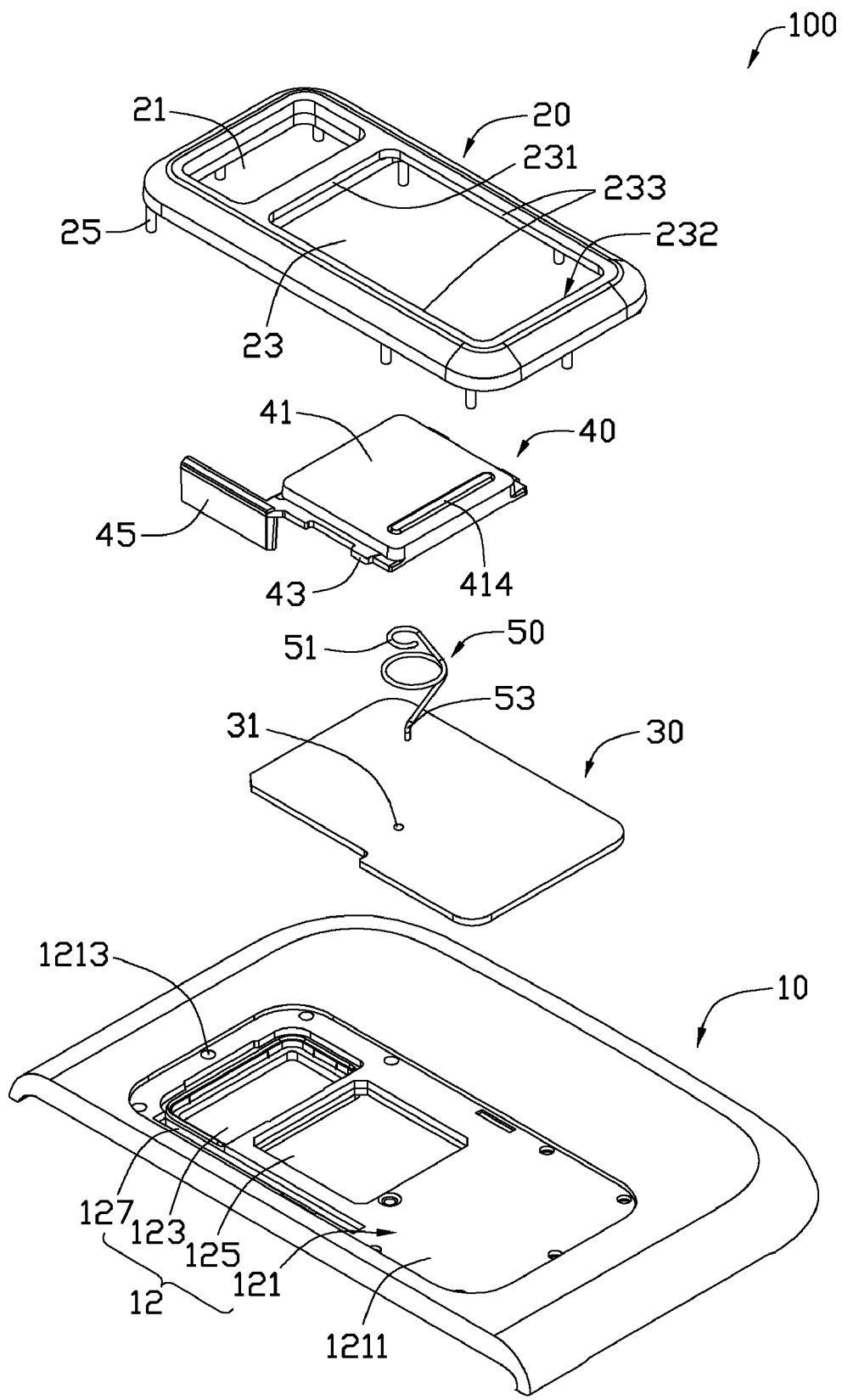
FIG. 2 is an exploded view of the portable electronic device shown in FIG. 1.

Referring to FIGS. 1 and 2, an exemplary embodiment of a lens cover 40 as disclosed is applied in a portable electronic device 100, such as a cellular phone or any electronic device where a lens is desirable. The portable electronic device 100, also as disclosed, includes a housing 10, a rear cover 20, a lens 30, a lens cover 40 and an elastic element 50. The rear cover 20 is attached to the housing 10 to form an enclosure 60 accommodating the lens 30 and the lens cover 40. The lens 30 is mounted on the housing 10. The lens cover 40 is slidably mounted between the lens 30 and the rear cover 20 to selectively cover or expose the lens. The elastic element 50 is mounted between the lens cover 40 and the lens 30 and slides the lens cover 40 by elastic force.

The housing 10 includes a mounting portion 12. The mounting portion 12 includes a recess 121, a photoflash hole 123, a camera hole 125 and a passage 127. The passage 127 is longitudinally defined through a bottom wall 1211 of the recess 121 and located adjacent to an inner wall of the recess 121. The photoflash hole 123 and the camera hole 125 are also defined through the bottom wall 1211 of the recess 121 and along the passage 127. The photoflash hole 123 is spaced from the camera hole 125, both of which are defined between the passage 127 and another opposite inner wall of the recess 121. The photoflash hole 123 may accommodate a photoflash (not shown) of the portable electronic device 100 therein. The camera hole 125 may accommodate a camera (not shown) of the portable electronic device 100 therein. The housing 10 further defines a plurality of retaining holes 1213 surrounding an edge of the bottom wall 1211 thereof.

The lens 30 is glass or other transparent material, and includes a latching portion in the form of a groove 31 defined therethrough. The groove 31 is configured to receive one end of the elastic element 50 therein.

The lens cover 40 includes a main body 41 of substantially the same shape as the camera hole 125 and larger. Each side of the main body 41 has at least one guide plates 43 protruding therefrom. The guide plates 43 are slidably mounted in a guiding groove in the form of a slit 70 (seen FIG. 1) defined between the lens 30 and the rear cover 20, such that the main body 41 of lens cover 40 can slide relative to the lens 30 to open or close the camera hole 125. When the lens cover 40 is closed as shown in FIG. 1, the lens 30 aligned with the camera hole 125 is completely covered and protected by the main body 41.

Figure 4:
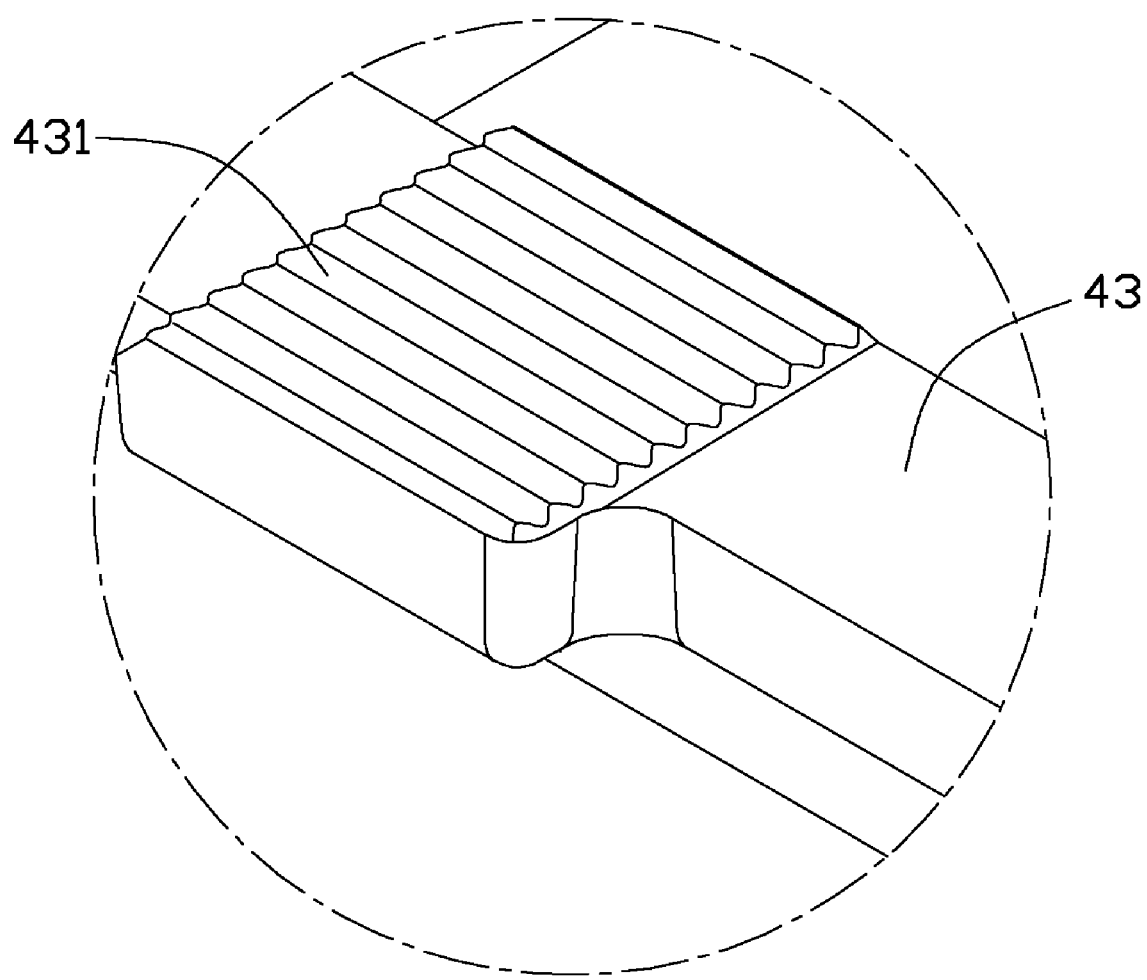
FIG. 4 is a partially enlarged view of the portable electronic device shown in FIG. 3.

The lens cover 40 further includes a plurality of contact portions 431, a trigger 45, a projection 412 and a finger grip portion 414. Each contact portion 431 includes a plurality of projection strips (see FIG. 4) protruding from a bottom surface of the guide plates 43 facing the lens 30 and along the direction of the lens cover 40 motion. The contact portions 431 contact the lens 30 when the lens cover 40 is mounted thereon, preventing the bottom surface of the lens cover 40 from directly contacting the lens 30 and decreasing the frictional area therebetween and reduce the potential for scratching the lens from that of conventional designs. Thus, motion of the lens cover 40 relative to the lens 30 is easier.

The trigger 45 in the form of a rectangular plate protrudes from a distal end of one guide plate 43 on the lens cover 40. The trigger 45 is slidably accommodated in the passage 127 and partially received in the housing 10. When the lens cover 40 slides relative to the lens 30, the trigger 45 slides with the lens cover 40 and activate a switch (not shown) that turns on the digital camera (not shown). The projection 412 is a post protruding from a surface of the main body 41 facing the lens 30. The projection 412 is configured to engage the elastic element 50. The finger grip portion 414 is a rib transversely protruding from another surface of the main body 41 opposite to the projection 412. The finger grip portion 414 facilitates the lens cover 40 sliding over the lens 30.

Figure 3:
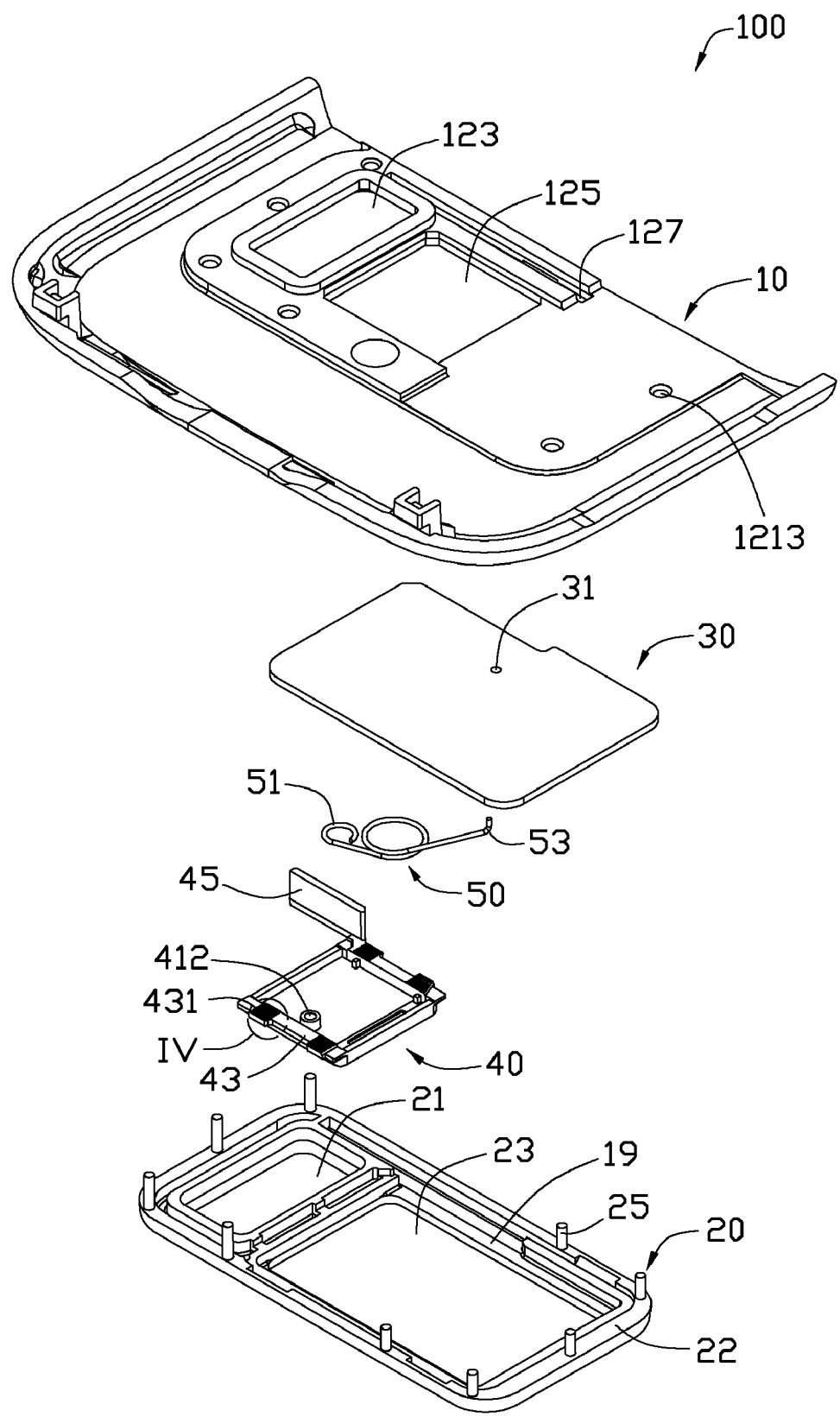
FIG. 3 is similar to FIG. 2, but shows the portable electronic device in another aspect.

Referring to FIGS. 2 and 3, the rear cover 20 includes a bottom panel 19 and a peripheral panel 22 protruding from an edge of the bottom panel 19. The rear cover 20 has a first window 21 and a second window 23 defined through the bottom panel 19. The first window 21 corresponds to the photoflash hole 123 and accommodates a cover therefor. The second window 23 corresponds to the camera hole 125 and accommodates the lens cover 40. The second window 23 is defined by a first inner surface 231, a second inner surface 232 opposite the first inner surface 231, and two opposite third inner surfaces 233 connecting the first inner surface 231 with the second inner surface 232. A length between the first inner surface 231 and the second inner surface 232 meets the length of the sliding distance of the lens cover 40. A width between the third inner surfaces 233 meets the width of the main body 41 of the lens cover 40. The rear cover 20 further has a plurality of retaining posts 25 protruding from a distal end portion of the peripheral panel 22. The retaining posts 25 are received in the retaining holes 1213 to assemble the rear cover 20 to the housing 10.

The elastic element 50 is mounted between the lens cover 40 and the lens 30, providing elastic force to slide the lens cover 40. In this exemplary embodiment, the elastic element 50 is a coil spring including a annular portion 51 formed on one end thereof and a hook 53 formed on the other. The elastic element 50 is mounted to the lens cover 40 in such a manner that the annular portion 51 of the elastic element 50 is received in the projection 412 of the lens cover 40. The elastic element 50 is mounted to the lens 30 in such a manner that the hook 53 of the elastic element 50 is received in the groove 31 of the lens 30.

Referring to FIGS. 1 to 3, during assembly of the portable electronic device 100, the lens 30 is attached to the bottom wall 1221 in the recess 121 to cover the camera hole 125, and the annular portion 51 of the elastic element 50 is hooked on the projection 412 of the lens cover 40. The trigger 45 of the lens cover 40 is received in the passage 127 through the bottom wall 1221, and the hook 53 of the elastic element 50 is received in the groove 31 of the lens 30, mounting the lens cover 40 on the lens 30. The contact portion 431 of the lens cover 40 is attached on the lens 30, and the lens cover 40 covers the camera hole 125 of the housing 10. The retaining posts 25 of the rear cover 20 are received in the retaining holes 1213 of the housing 10 such that the rear cover 20 is assembled thereto. The guide plates 43 of the lens cover 40 are slidably mounted to the slit 70 defined between the lens 30 and the rear cover 20, and the first inner surface 231 of the second window 23 lightly biases the lens cover 40 so the elastic element 50 is slightly distorted to generate return elastic force. Thereby, the lens cover 40 is firmly accommodated in the second window 23.

In use, the finger grip portion 414, moved toward the second inner surface 232 of the second window 23, moves the projection strips 431 of the lens cover 40 on the lens 30 toward the second inner surface 232. The annular portion 51 of the elastic element 50 also moves toward the second inner surface 232 such that the elastic element 50 is distorted and generates elastic force. When the annular portion 51 is aligned with the hook 53, the elastic element 50 is mostly distorted and generates a maximum elastic force, whereby the lens cover 40 is in an intermediate state. The finger grip portion 414 is continuously moved toward the second inner surface 232 until the annular portion 51 passes the intermediate state, and the elastic element 50 expands under generated elastic force, which continuously moves the lens cover 40 to the second inner surface 232. The trigger 45 activates a switch (not shown) that turns on the digital camera (not shown), and the camera hole 125 is exposed, the portable electronic device 100 thus being ready to capture an image.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens cover slidably mounted to a lens, the lens cover comprising:
    a main body; and
    two guide plates respectively protruding outwardly from two opposite sides of the main body;
    wherein when the lens cover slides relative to the lens, the guiding plates slide on the lens;
    each guide plate comprises a plurality of contact portions, each comprising a plurality of projection strips protruding from a surface thereof facing the lens.

2. The lens cover of claim 1, wherein the projection strips protrude along a direction of the lens cover sliding.

3. The lens cover of claim 1, wherein the projection strips are attached on the lens to mount the lens cover thereto.

4. The lens cover of claim 1, wherein the lens cover further comprises a finger grip portion transversely protruding from another surface opposite the projection strips.

5. A portable electronic device comprising:
    a housing;
    a rear cover mounted to the housing;
    a lens mounted to the housing; and
    a lens cover, slidably mounted to the lens, the lens cover comprising:
    a main body; and
    two guide plates respectively protruding outwardly from two opposite sides of the main body;
    wherein when the lens cover slides relative to the lens, the guiding plates slide on the lens; each guide plate comprises a plurality of contact portions, each including a plurality of projection strips protruding from a bottom surface thereof facing the lens; the projection strips contact the lens when the lens cover is mounted on the lens, to prevent the bottom surface of the lens cover from directly contacting the lens and decreasing the frictional area therebetween.

6. The portable electronic device of claim 5, wherein the projection strips protrude along a direction of the lens cover sliding.

7. The portable electronic device of claim 5, wherein the projection strips are attached on the lens.

8. The portable electronic device of claim 5, wherein the lens cover further comprises a finger grip portion transversely protruding from another surface opposite the projection strips.

9. The portable electronic device of claim 5, wherein the housing comprises a mounting portion formed thereon, the mounting portion comprising a recess and a camera hole defined through a bottom wall of the recess, and wherein the lens is attached to the bottom wall in the recess.

10. The portable electronic device of claim 9, wherein the bottom wall of the recess comprises a plurality of retaining holes defined therein, in which a plurality of retaining posts protruding from the rear cover are received.

11. The portable electronic device of claim 9, wherein the rear cover comprises a window defined therein corresponding to the camera hole of the housing, in which the main body of the lens cover is slidably accommodated.

12. The portable electronic device of claim 11, wherein the window is defined by a first inner surface, a second inner surface opposite the first inner surface, and two opposite third inner surfaces connecting the first inner surface with the second inner surface, a length between the first inner surface and the second inner surface meets the length of the sliding area of the lens cover, a width between the third inner surfaces meets the width of the main body of the lens cover.

13. The portable electronic device of claim 5, wherein a guiding groove is defined between the rear cover and the housing, in which the guide plates are received.

14. The portable electronic device of claim 5, wherein the portable electronic device further comprises an elastic element, mounted between the lens and the lens cover and providing elastic force sliding the lens cover.

15. The portable electronic device of claim 14, wherein the elastic element is a coil.

16. The portable electronic device of claim 15, wherein one end of the coil comprises an annular portion formed thereon, and the lens cover comprises a projection protruding from the main body on which the annular portion is hooked.

17. The portable electronic device of claim 16, wherein another end of the coil comprises a hook formed thereon, latched in a latching portion defined in the lens.

18. The portable electronic device of claim 17, wherein the latching portion is a groove defined in the lens.

19. A portable electronic device comprising:
a housing;
a rear cover mounted to the housing;
a lens mounted to the housing; and
a lens cover, slidably mounted to the lens, the lens cover comprising:
a main body; and
two guide plates respectively protruding outwardly from two opposite sides of the main body;
wherein a guiding groove is defined between the rear cover and the housing to receive the guide plates therein; when the lens cover slides relative to the lens, the guide plates slide in the guiding groove; each guide plate comprises a plurality of contact portions, each contact portion includes a plurality of projection strips protruding from a surface thereof facing and contacting the lens.

20. The portable electronic device of claim 19, wherein the projection strips protrude along a direction of the lens cover sliding.

* * * * *